United States Patent
Nakajima et al.

[11] Patent Number: 5,299,828
[45] Date of Patent: Apr. 5, 1994

[54] AIR BAG INFLATOR HAVING CIRCUMFERENTIALLY DISPOSED AUTO IGNITION MATERIAL

[75] Inventors: Hideo Nakajima; Akira Kokeguchi, both of Shiga, Japan

[73] Assignee: Takata Corporation, Tokyo, Japan

[21] Appl. No.: 986,619

[22] Filed: Dec. 7, 1992

[30] Foreign Application Priority Data

Jan. 10, 1992 [JP] Japan ................ 4-003072

[51] Int. Cl.5 .............................. B60R 21/26
[52] U.S. Cl. .................... 280/741; 422/165
[58] Field of Search .......... 280/741, 734, 736, 728 R, 280/737, 742; 422/164, 165, 166; 102/530, 531; 60/256

[56] References Cited

U.S. PATENT DOCUMENTS

| | | | |
|---|---|---|---|
| 3,815,359 | 6/1974 | Thurston | 60/256 X |
| 4,084,512 | 4/1978 | San Miguel | 102/531 |
| 4,561,675 | 12/1985 | Adams et al. | 280/741 X |
| 4,858,951 | 8/1989 | Lenzen | 280/741 |
| 4,944,528 | 7/1990 | Nilsson et al. | 280/741 |
| 4,950,458 | 8/1990 | Cunningham | 280/741 X |
| 5,100,174 | 3/1992 | Jasken et al. | 280/741 |
| 5,104,466 | 4/1992 | Allard et al. | 280/741 X |
| 5,186,491 | 2/1993 | Yoshida et al. | 280/741 |

FOREIGN PATENT DOCUMENTS

| | | |
|---|---|---|
| 0359408 | 3/1990 | European Pat. Off. |
| 0369579 | 5/1990 | European Pat. Off. |
| 0496488 | 7/1992 | European Pat. Off. |
| 3824469 | 1/1990 | Fed. Rep. of Germany |
| 2-63951 | 3/1990 | Japan |
| 2-74441 | 3/1990 | Japan |

Primary Examiner—Margaret A. Focarino
Assistant Examiner—Peter C. English
Attorney, Agent, or Firm—Kanesaka & Takeuchi

[57] ABSTRACT

An inflator of an air bag device includes a cylindrical vessel having gas releasing openings disposed at the circumferential surface thereof, a gas generating agent disposed in the vessel, a boosting agent for starting a gas generating reaction of the gas generating agent, and an igniting agent having an ignition point lower than that of the boosting agent. The igniting agent is disposed over almost the entire inner surface of the vessel.

5 Claims, 2 Drawing Sheets

AIR BAG INFLATOR HAVING CIRCUMFERENTIALLY DISPOSED AUTO IGNITION MATERIAL

FIELD OF THE INVENTION

The present invention relates to an inflator of an air bag device for use in a passenger seat.

DESCRIPTION OF THE RELATED ART

An inflator of an air bag device for use in a passenger seat comprises a cylindrical vessel having gas releasing openings disposed at the circumferential surface, a gas generating agent charged in the vessel, a boosting agent for initiating a gas generating reaction of the gas generating agent and an igniting agent having an ignition point lower than that of the boosting agent. The vessel is usually made of aluminum or aluminum alloy.

As described in Japanese Patent Laid Open Hei 2-63951 corresponding to U.S. patent application Ser. No. 190,479 (filed on May 4, 1989) and Japanese Patent Laid Open Hei 2-74441 corresponding to German Patent Application DEP 3824469.1 (filed on Jul. 19, 1988), an igniting agent is disposed so as to react the gas generating agent before the strength of the aluminum or aluminum alloy is reduced to the point of failure when the inflator of the air bag device encounters a fire accident and the peripheral temperature thereof is elevated. Since the ignition point (reaction starting temperature) of the igniting agent is lower than that of the boosting agent, the igniting agent ignites first upon a fire to ignite the boosting agent by the heat and, as a result, the gas generating agent starts the gas generating reaction.

Upon collision of a vehicle, an electric igniting device disposed separately ignites the boosting agent.

The igniting agent has been disposed to a portion at one end face of the vessel as shown in FIG. 2 of Japanese Patent Laid Open Hei 2-63951 and FIG. 1 of Japanese Patent Laid Open Hei 2-74441.

In the inflator of the air bag device in which the igniting agent is disposed to one end face of the vessel, when the inflator undergoes heat of fire from the other end thereof, ignition of the igniting agent is delayed by the period of time that the heat conducts from the other end to the one end.

OBJECT AND SUMMARY OF THE INVENTION

An object of the present invention is to provide an inflator in which an igniting agent ignites in an early stage in response to fire when the inflator is exposed to a fire and any part of the inflator is heated.

An inflator of an air bag device in the first aspect of the present invention comprises a cylindrical vessel having gas releasing openings disposed at the circumferential surface, a gas generating agent charged in the vessel, a boosting agent for starting the gas generating reaction of the gas generating agent and an igniting agent having an ignition point lower than that of the boosting agent, wherein the igniting agent is disposed so as to be distributed over almost the entire inner surface of the vessel.

In the second aspect of the present invention, in an inflator of an air bag device as defined in the first aspect, the igniting agent is deposited substantially over the entire inner surface of the vessel.

In the inflator of the air bag device in accordance with the present invention, since the igniting agent is applied to the wide range of the inner surface of the vessel, the igniting agent ignites in an early stage when any part of the inflator is heated on a fire.

PREFERRED EMBODIMENT

Figure 1:
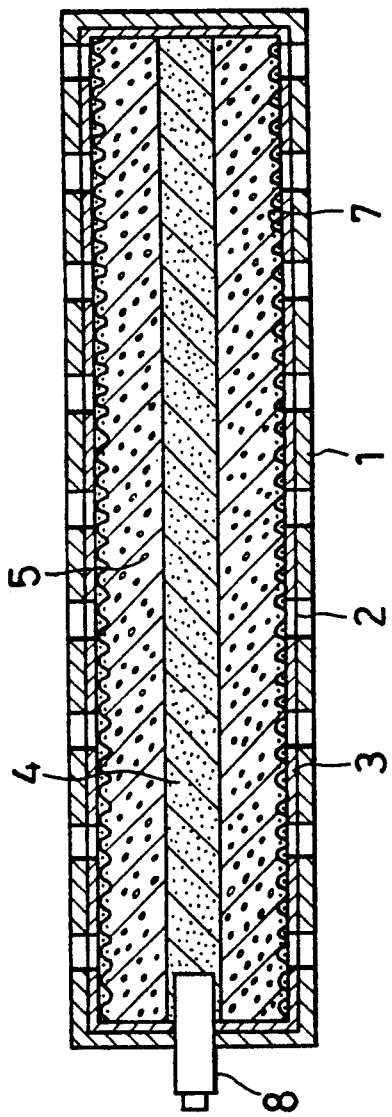
FIG. 1 is a cross sectional view along the longitudinal direction of an inflator according to an embodiment of the present invention.

Description will now be made to preferred embodiments of the present invention with reference to the drawings.

A vessel 1 is in a cylindrical shape and has a plurality of openings 2 perforated at the circumferential portion thereof. The vessel 1 is made of aluminum or aluminum alloy. An igniting agent 3 is coated over the entire inner surface of the vessel 1. A boosting agent 4 is disposed along the axial center of the vessel 1. A gas generating agent is disposed around the boosting agent 4.

A filter 7 is disposed along the inner circumferential surface of the vessel 1 coated with the igniting agent 3. The filter 7 has a function of filtering a gas jetting out through the openings 2. An electric igniting device 8 is disposed at one end face of the vessel 1. The electric igniting device 8 has a wire that generates heat upon electric current supply and a gunpowder, in which the gunpowder is ignited upon electric current supply to the wire, so that the boosting agent 4 ignites and the gas generating agent 5 starts reaction.

In the air bag device having the inflator having thus been constituted, when a vehicle having the air bag device mounted thereon is involved in an accident such as collision of a vehicle, electric current is supplied to the electric igniting device 8, in which the boosting agent 4 ignites and the gas generating agent 5 starts reaction as described above to rapidly generate a great amount of gases. The gases are jetted out through the openings 2 to extend the air bag rapidly.

When the inflator is exposed to a fire, the igniting agent 3 ignites first and, successively, the boosting agent 4 and the gas generating agent 5 also starts reaction. Generated gases are released through the openings 2.

In this inflator, since the igniting agent 3 is disposed over the entire inner surface of the vessel 1, the igniting agent 3 ignites at an early stage when any part of the inflator is heated by a fire, so that gas is generated from the inflator while the vessel 1 maintains a sufficient strength. Accordingly, the vessel 1 is free from bursting.

In this embodiment, since the igniting agent 3 is coated on the inner surface of the vessel 1, the igniting agent 3 can easily be deposited uniformly over the entire inner surface of the vessel 1.

Figure 2:
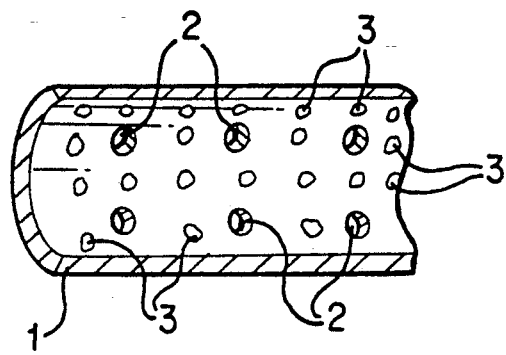
FIGS. 2 and 3 are explanatory perspective views of parts of vessels for showing different arrangements of igniting agents inside the vessels.
Figure 3:
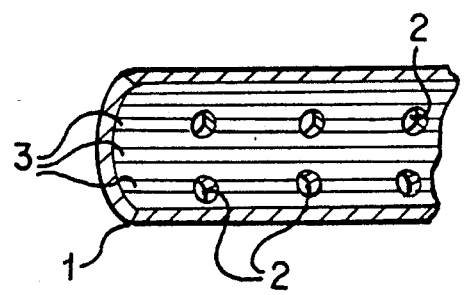

In this embodiment, the igniting agent 3 is deposited over the entire inner surface of the vessel 1 but, instead, the igniting agent 3 may be applied over the entire inner surface of the vessel 1 in a scattered pattern or intermittently as shown in FIG. 2. Alternatively, the igniting agent 3 may be applied in a striped pattern over the entire inner surface of the vessel 1 as shown in FIG. 3.

Further, the igniting agent 3 is coated also to both end faces of the vessel 1 in this embodiment, but the igniting agent may be applied only to the inner circumferential surface of the vessel 1.

In the present invention, BKNO$_3$ (boron potassium nitrate) mixed with TiH$_2$ (hydrogenated titanium) and KClO$_4$ (potassium perchrolate) may be used, for example, as the boosting agent. Smokeless powder that ignites at about 150° C.–200° C. is suitable for instance as the igniting agent.

As has been described above, with the inflator according to the present invention, since the igniting agent ignites at an early stage irrespective of the direction of heat applied to the inflator upon a fire accident, the gas generating reaction of the gas generating agent proceeds while the vessel still maintains a sufficient strength.

What is claimed is:

1. An inflator of an air bag device comprising:
   a cylindrical vessel having an inner surface and gas releasing openings disposed in said inner surface about the circumference thereof,
   a gas generating agent disposed in said vessel for inflating an air bag,
   a boosting agent for starting a gas generating reaction of said gas generating agent, said boosting agent being located in a middle of said gas generating agent,
   an igniting agent having a pyrolytic temperature lower than that of said boosting agent, said igniting agent being disposed outside the gas generating agent and distributed over almost the entire inner surface of the cylindrical vessel so that the igniting agent reacts first when the vessel is heated, and
   means for igniting said boosting agent actuated only when said air bag is to be inflated for protecting a user.

2. An inflator as set forth in claim 1, wherein the igniting agent is deposited completely over the entire inner surface of the vessel.

3. An inflator as set forth in claim 1, wherein the igniting agent is coated to the inner surface of the vessel.

4. An inflator as set forth in claim 1, wherein the igniting agent is applied to the inner surface of the vessel in a scattered pattern.

5. An inflator as set forth in claim 1, wherein the igniting agent is applied in a stripped pattern to the inner surface of the vessel.

* * * * *